Dec. 26, 1939.  H. B. SMITH ET AL  2,184,534
PIPE WELDING AND HEAT-TREATING PROCESS AND MEANS
Filed Nov. 26, 1937  3 Sheets-Sheet 1
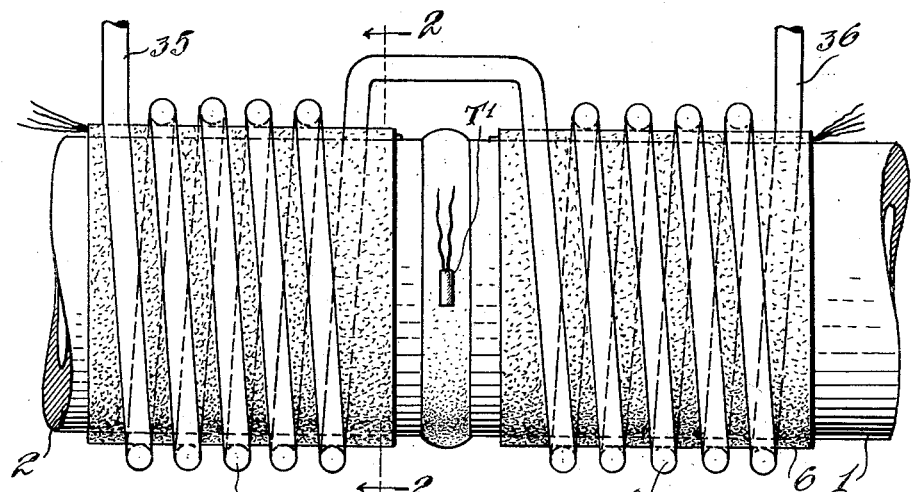
Fig. 1
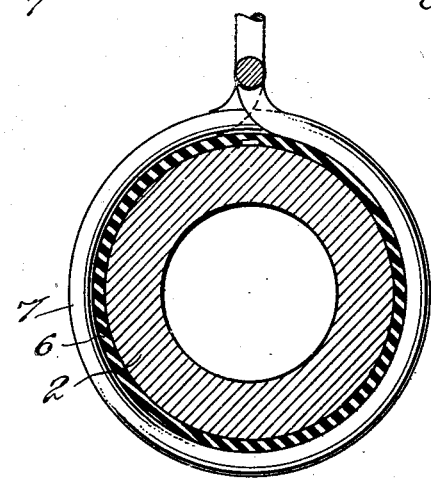
Fig. 2
Fig. 3
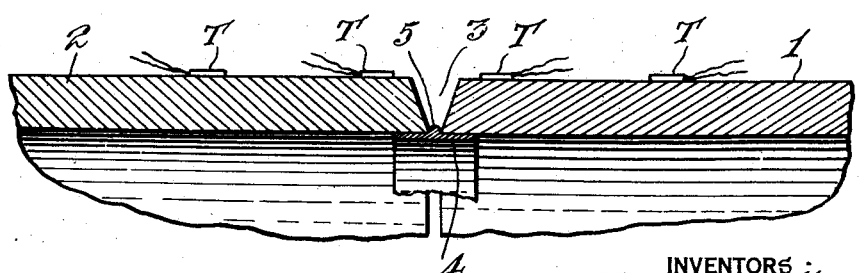
INVENTORS
Harry B. Smith
George A. Dolan
BY
A. D. T. Libby
ATTORNEY

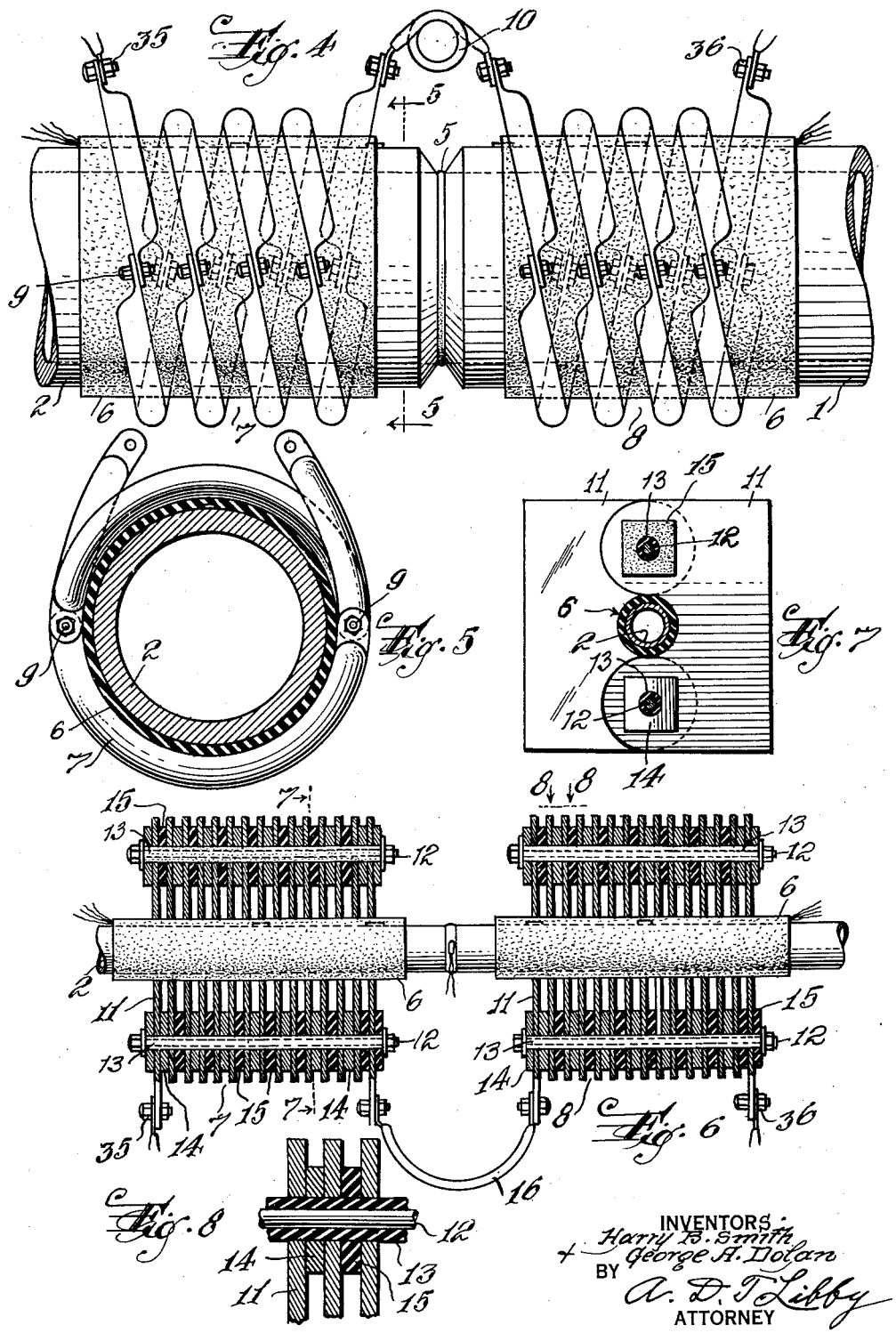

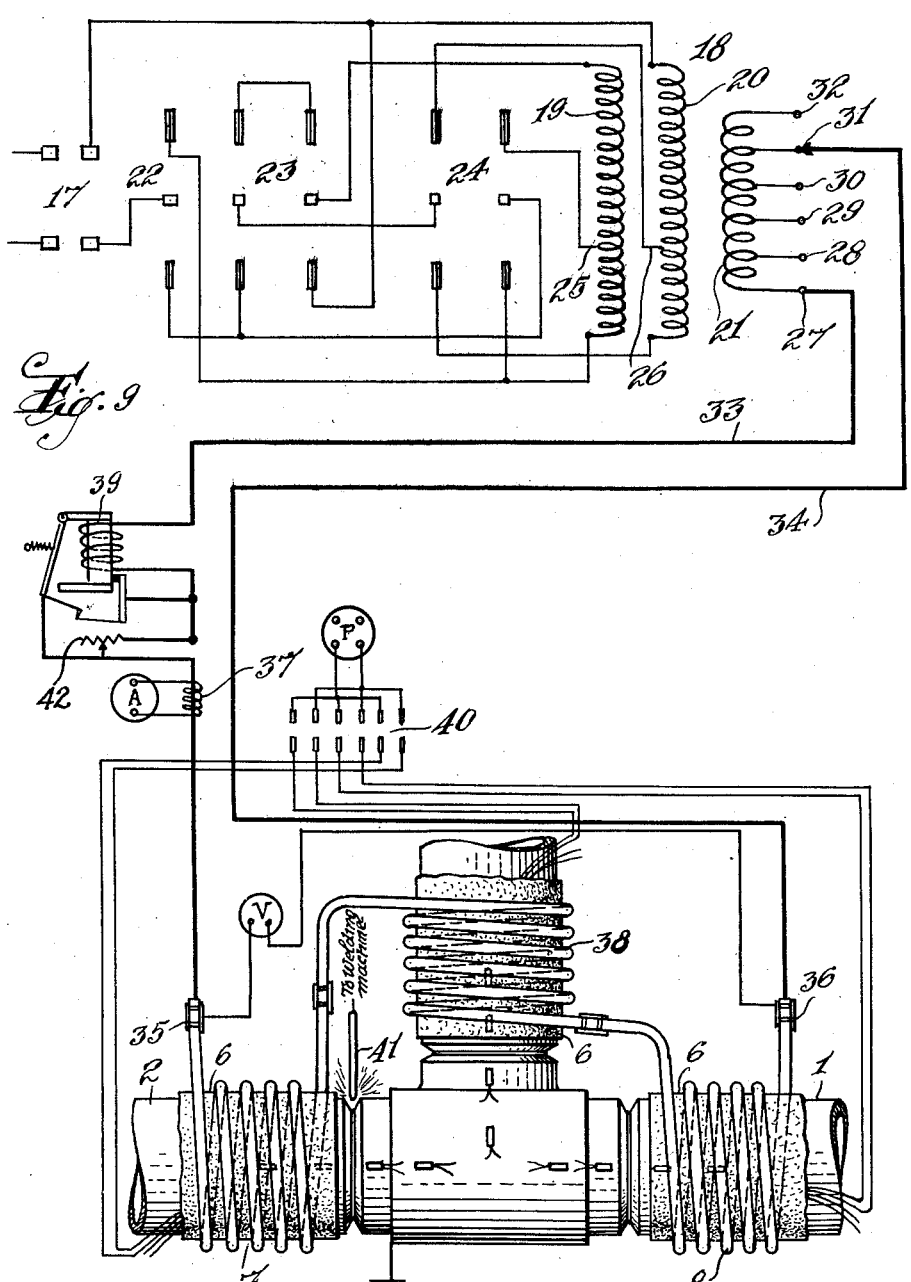

Patented Dec. 26, 1939

2,184,534

UNITED STATES PATENT OFFICE 2,184,534

PIPE WELDING AND HEAT-TREATING PROCESS AND MEANS

Harry B. Smith, Glen Rock, and George A. Dolan, Hohokus, N. J.

Application November 26, 1937, Serial No. 176,508

10 Claims. (Cl. 219—10)

This invention relates to a method or process of joining metallic members together, such as pipes, rails and the like, and involves, in most cases, steps of preheating, arc welding and normalizing or stress-relieving.

In welding certain structures and materials, stresses are set up therein due to localization of the heat from the arc. For example, in butt-welding the ends of pipes together, these stresses may become quite pronounced on large heavy-walled pipe, and where such pipes are used to carry steam under high pressure, it becomes very important that the welds be as nearly perfect as it is possible to make them.

Various means have been proposed for relieving these stresses before and after the weld has been made; for example, oven type heaters have been made to fit around the pipe, the ovens being usually heated with gas or fuel oil, or electrically. It has also been proposed to apply electrical resistance heater strips to the pipe, but from experiments we have made, we have found these and other methods to be very limited in their field of application, as well as slow and expensive and otherwise open to numerous objections.

After much study and experimentation we have found what we term to be the induction method of treating the pipes or other material to be the most practical and satisfactory. It is therefore the principal object of our invention to provide a process of pipe welding and heat treating which overcomes the objections above mentioned, and others which we have encountered in our experimental work, and at the same time provide a process which is relatively simple, with low cost, but highly efficient in practical application.

Another object of our invention is to provide a process which can be applied to practically every situation which may arise; or stated in another way, it is the object of our invention to provide a process, to be hereinafter described, which has a wide field of application.

These and other objects will be apparent to one skilled in this art, after a study of the specification taken in connection with the annexed drawings, wherein:

Figure 1 is a plan view of our invention applied to butt-welding pipe, the weld having already been completed.

Figure 2 is a section on the line 2—2 of Figure 1.

Figure 3 is a fragmentary, longitudinal view of the two pipe portions shown in Figure 1 during one step in the process; that is to say, just before the heat-treating means is applied to the pipe joint and before the weld is made.

Figure 4 is a view similar to Figure 1, but before the weld is made and showing a modified form of heat-treating means.

Figure 5 is a section on the line 5—5 of Figure 4.

Figure 6 shows a view similar to Figure 1, showing a further modified form of heat-treating means.

Figure 7 is a view on the line 7—7 of Figure 6.

Figure 8 is a longitudinal view on an enlarged scale on the line 8—8 of Figure 6.

Figure 9 is a wiring diagram of our process as applied to the welding of a T-joint.

In the various views, wherein like numbers refer to corresponding parts, 1 and 2 are the ends of two pipes which are to be welded together at 3, at which point the pipe ends are preferably beveled at the proper angle to facilitate the welding operation. In welds of this type, a backing ring 4, which is usually split for easy assembly, is used, as illustrated in Figure 3. In some cases, the ring 4 may be provided with a circular bead 5 projecting a slight distance upwardly within the gap 3 to assist in starting the welding operation. Assuming the pipes 1 and 2 have been placed in position ready for welding, we weld to each of the pipes 1 and 2, small members T which are preferably made of steel tubing ¾" long and ¼" in diameter. Within the tubes T are inserted thermo-couples, after which the tubes are flattened in any satisfactory manner as by a hammer blow, which is sufficient to flatten the tube onto the thermo-couple to hold it in place. At the same time, this aids in the application of a winding 6 of asbestos tape which is wound on to the pipes over the thermo-couple connection to the depth of approximately ⅛", and on which is wound a winding composed of parts 7 and 8, the turns of which are preferably insulated from each other by asbestos tape, after which the entire winding is covered with asbestos tape to prevent the workmen from contacting with the hot wires or conductors comprising the turns of the winding.

As a practical illustration, and referring to Figures 1 and 2, for welding a pipe having a ½" wall, we use five turns of 500,000 C. M. cable, so that the total thickness of the asbestos tape and cable is only approximately 1", and the two sections of the winding are placed as closely as possible to the gap 3 that is to be filled in with weld metal, and not interfere with the welding operation. In practice, in the illustration shown, the two coil portions 7 and 8 are approximately only 2" apart. It may be mentioned at this point that when alternating current is passed through the windings 7 and 8, the pipe ends 1 and 2 are heated by induction; that is to say, these pipe ends become a short-circuited turn within the windings 7 and 8. A certain amount of heat is also produced by the magnetic hysteresis action and eddy-currents which go on within the pipe.

In Figure 3 we have shown two thermo-couples close to the weld gap 3, and two at a distance away but still under the heating sections 7 and 8. Each thermo-couple is connected to a switch, as will be later pointed out with respect to Figure 9.

In Figure 4, the pipe, asbestos tape covering and thermocouples are similarly arranged as in Figure 1, but in this case, instead of having a continuous cable wound around the pipe ends as shown in Figure 1, each section 7 and 8 is made up of turns composed of tubing in the form of half circles whose ends are flattened and bolted together as at 9, the two sections being joined preferably by a flexible cable coupling device 10.

In Figure 6 the two winding sections 7 and 8 are built up of a plurality of metal plates 11 of good conducting material, such as copper. The plates are mounted on a pair of rods 12 which support a tubular insulator 13. Alternately on opposite sides of the pipe, the plates 11 are mechanically and electrically connected together by metallic spaces 14, preferably of copper; while directly opposite the spaces 14 the plates 11 are separated by insulating washers 15 preferably of Transite, which is a high-heat-resisting material, so that when the winding is put together it gives the same effect as the continuous conductor of Figure 1. The two sections 7 and 8 are joined together by a flexible connector 16.

In Figure 9 we have shown the application of the heating coils, such as shown in Figure 1, to a T-joint, with the heating coils connected in a heating circuit which we have found very practical for commercial work. In this arrangement, the switch 17 is a main supply switch for furnishing current to the heating transformer 18 having primary windings 19 and 20, and a secondary winding 21. A single-pole, double-throw switch 22, and double-pole, double-throw switches 23 and 24 are used for switching the primaries 19 and 20, with the taps 25 and 26, in series or parallel arrangement, so that the primaries may be operated from a 440-volt or 220-volt circuit. The various switching arrangements, together with the taps 27 to 32 inclusive, on the secondary 21, provide voltages varying from 5 to 30 volts in small steps varying from 2 to 5 volts. Thus there are available to the supply leads 33 and 34, coming from the secondary 21 of the transformer 18, voltages having the above range, which may be applied to the terminals 35 and 36 of the heating coils.

Connected in one of the supply leads 33 or 34, through the medium of a series transformer 37, is an ammeter A for indicating the amount of current going to the treating coils 7 and 8, in the case of Figures 1, 4 and 6, and 7, 8 and 38 in the case of Figure 9. Also connected in the lead 33 or 34 is an overload, and if desired, automatic current-reducing device and warning signal 39 which may be of the type shown in Holslag Patent 1,975,459, issued October 2, 1934, the purpose of which will be presently pointed out. Each thermocouple is taken to a double-pole, single-throw switch 40, three of which are shown, the corresponding sets of contacts being connected together and to an indicating instrument P, so that any thermo-couple may be connected at will to the indicating instrument. A welding electrode 41 is indicated in position for welding in Figure 9, it being assumed that the pipe ends 1 and 2 are grounded or connected to the other side of the welding machine which may be of any satisfactory type.

In the operation of our system, after the pipe has been prepared in the manner shown and described, we set the switches 22, 23 and 24, and the taps on the secondary of the treating transformer 18 to the desired voltage within the range previously specified, so as to deliver a current within the range of 400 to 800 amperes, depending on the size and thickness of the pipe wall, whereby the temperature of the pipe ends, adjacent the gap 3 which is to be filled with weld metal, is raised to about 450° F. Then the welding operation is ready to be started, but we have found from experience that it is preferable to cut off the current from the heat-treating windings while the welding is actually going on, as the magnetic field set up tends to interfere with the handling of the metallic electrode. The actual welding operation, however, applies heat to the joint and usually holds this at about 400° F.

After the first layer of weld material is applied completely around the pipe, the current through the treating coils is again applied and the chipping operation is started, if this is found necessary. Because of the extra precautions that must be taken in welding a pipe that is to be used in a high-pressure steam line, we prefer to chip off the outside portion of each welded layer, so that the welder may better visualize the work done, and also to present a clean metal for the next layer to be applied. This procedure is followed out step by step until the weld has been finally completed.

Then a thermo-couple tube T₁ is welded to the finished weld about as indicated in Figure 1, and after the thermo-couple has been inserted into the small steel tube thus attached to the weld it is preferably hammered down as heretofore explained, in order to insure a large area of contact with the thermo-couple wire ends. After this, the asbestos tape is wrapped around the weld, covering the thermo-couple element T₁, and then current is again applied to the treating windings and the temperature is slowly raised from the welding temperature until the thermo-couple on the weld indicates a temperature of only 1100° to 1200° when the material is carbon steel, and 1200° to 1250° F. when the material is carbon molybdenum steel. After the required temperature is reached, it is held for one hour for each inch of wall thickness of the pipe that has been welded, and then allowed to drop, say 400° F. per hour until a temperature of 400° F. is reached, after which the current is cut off, but the wrapping is left on the pipe until the temperature has dropped to room temperature.

As an additional check on the thermo-couples at the time the highest temperature is reached, as above described, we make use of the fact that steel or iron begins to rapidly lose its magnetism at around 1100° F., in which case the reactance rapidly diminishes and the current, which is alternating in character, rapidly increases, so that the use of the device 39, as indicated, will act in association with an impedance 42 as an overload and, if desired, automatic current-reducing means and warning signal. In other words, when the pipe reaches this critical temperature, so that the reluctance rapidly diminishes and the current through the windings increases, the temperature would jump up very rapidly, so that the device 39 may be set to automatically hold the temperature at a predetermined high value if the attendant does not manually regulate the current supply on hearing the warning signal. Any other type of current relay, combined with a signal, may be used for this purpose.

When two pieces of pipe are to be welded together, they are separated by the space 3 at the joint, so that the magnetic reluctance is high when the welding operation is started, and the operators, after a little experience, can tell from the readings of the ammeter and voltmeter V something of the character of their work, as different welds on the same pipe are made. For example, if the welder has failed to burn in the electrode metal on one of the pipes, the reluctance will be high and indications will be given on the meters. Since the weld has to be made all the way around the pipe, there will be times when the welder will be welding in a vertical position and overhead, so that this further check on the welder's work is of considerable importance. If the weld is made as perfectly as possible, the meters should check very closely in their readings for the different layers put down or welded in place. A check on this is provided by welding the same size and type of pipe in a test room where the short pipe ends may be turned so that all the welding is done in the most advantageous welding position, readings of the ammeter and voltmeter being taken by an attendant or observer as the different weld layers are put down. Then the work in the actual installation is checked as the weld is made against this standard.

From what has been said, it will be understood that our process of pipe-welding and heat-treating may be applied to any pipe that has a 2" clearance around it, and is especially adapted for welding joints of the type shown in Figure 9. While we have shown numerous thermo-couples along the length of the pipe to be welded, those more remote from the weld may not be required after the welder has gained in experience in the use of our process.

The same coils or windings are used for preheating and normalizing or stress-relieving or annealing, without changing their position during the entire process, and without interfering with the arc welding operations. This is a very important feature in that it saves much time in the complete process of finishing a welding joint. As far as we know, windings have been used for normalizing or stress-relieving a joint that has been previously welded, but we believe we are the first to utilize a complete induction process as heretofore described. Fundamentally, the idea of applying an induction coil to a weld after it has been completed, for the purpose of relieving the stresses in the material, is not basically sound, because in many cases the weld must be allowed to cool at least a certain amount before the coil can be applied, and stresses may be set up therein which would cause a crack before this step can be taken; whereas in our system, since the coils are already in place immediately the welding operation ceases, current is applied to the windings and the normalizing step begins almost immediately, without any loss of time and without any chance of stresses being set up in the weld, and, as has already been explained, where we apply the windings before starting the welding operations, the manner of application makes it possible to preheat, weld and normalize joints that are impossible to get at with any other method.

In practical operation, we prefer to mount the instruments, such as the ammeter, voltmeter and pyrometer, with the switches controlling the thermo-couple circuits, on a small recording table so that one observer can take the readings from several welds which may be going on simultaneously. In some cases we prefer to have a heating element in the box or compartment containing the pyrometer so as to keep its temperature above 32° F. The heat-treating transformer 18 is preferably placed as close as possible to the pipes to be treated.

While we have shown certain switching arrangements and a certain type of transformer for supplying the preheating and normalizing current, it is to be understood that the transformer for this purpose may take other forms than that shown. For example, the source of current supply may be an auto-transformer with as many taps as desired, or some other type of induction regulator for getting the desired voltage and current to the heating coils. While we have shown in our drawings the application of our process to welding pipes, wherein it is very useful, it may be applied to welding steel rails, or for re-hardening such rail ends, as is now frequently done to prevent cupping or chipping. Certain steps in the process may of course be used for heat-treating or stress-relieving pipes, where occasion requires, without the welding operation.

In the preceding description we have given an outline of what we have found to be practical applications of our process for the welding and heat-treating of pipes, but it is obvious that certain of the details, other than those mentioned, for carrying our invention into practice may be varied, without departing from the spirit of the invention or the scope of the appended claims.

What we claim is:

1. The process of butt-welding metallic members together which consists in applying windings around the adjacent parts of said members, passing alternating current through said windings to establish alternating electro-magnetic fields uniformly around said parts to induce preheating currents in said parts, then arc-welding the joint between the members while the windings are still in place, and when the welding is completed then immediately applying the current again to said windings and controlling it so as to normalize the weld.

2. The process of butt-welding metallic members together which consists in applying windings around the adjacent parts of said members, passing alternating current through said windings to establish alternating electro-magnetic fields around said parts to induce preheating currents in said parts until a predetermined temperature, preferably above that of the metal while welding, is reached, cutting off the current and then arc welding the joint between said members with the windings still in place, and then applying the current after the weld is completed and raising the temperature of the weld and material adjacent thereto to a predetermined maximum, and then regulating the current through the windings so the weld is cooled slowly as and for the purposes described.

3. The process of operating on metallic members arranged in abutting relationship which consists in applying windings around the adjacent parts of said members, passing alternating current of a suitable strength through said windings to establish alternating electro-magnetic fields around said parts to induce preheating currents in said parts, then operating on the joint parts of the metallic members according to the operation required including arc welding the joint parts together with the windings still in position, and then further heat-treating the metal at the joint by regulating the current through said windings so as to produce the desired results.

4. The process of operating on metallic members arranged in abutting relationship which consists in applying windings around the adjacent parts of said members, passing alternating current of a suitable strength through said windings to establish alternating electro-magnetic fields around said parts to induce preheating currents in said parts until a predetermined temperature is reached, cutting off the current from the windings and then operating on said joint parts including arc welding the joint parts together with the windings still in position, applying current to the windings when necessary during said operating period, then as soon as the operations are completed applying current to the windings and regulating the current so as to heat-treat the said ends to get the desired result.

5. The process of butt-welding metal members together which consists in bringing the ends of the members into welding position, preheating said ends by establishing an alternating electro-magnetic field uniformly around said ends, then arc-welding the joint between the ends and when the weld is completed then immediately establishing an alternating electro-magnetic field uniformly around said ends, but of greater intensity than the field of the preheating step, and controlling said last-mentioned step so as to normalize the weld.

6. The process of butt-welding metal pipes together which consists in bringing the ends of the pipe into welding position, preheating said ends to a predetermined temperature by establishing an alternating electro-magnetic field uniformly around said ends, removing the magnetic field and then applying, by arc-welding, a layer of weld material around the pipe joint, again establishing said field and, while maintaining the field, chipping the weld layer where necessary, then removing the field and applying another layer of weld material, and so on until the weld is completed, then establishing a stronger alternating electro-magnetic field uniformly around said ends, and controlling this field so as to normalize the weld.

7. Means for butt-welding metallic members together including windings adapted to be positioned around adjacent ends of said members and spaced a short distance from the ends to be welded, means for passing alternating current through said windings to cause preheating of said ends, means for arc-welding the joint between said members with the windings still in place, and means, including at least part of said first-mentioned current-passing means, for again applying alternating current of a higher value than at first to the windings after the weld is completed, and controlling the current so as to normalize the weld and means responsive to changes in reluctance in the pipe for automatically introducing a reactance into the circuit of the windings to compensate for that lost in the pipe setup and preventing an undue rise of current in said windings, said last-mentioned means being capable of setting up a warning signal.

8. The process of butt-welding metal pipes together which consists in bringing the ends of the pipes into welding position, preheating said ends by establishing an alternating electro-magnetic field uniformly around said ends, removing the magnetic field, electric arc-welding the joint between the ends and when the weld is completed immediately establishing an alternating electro-magnetic field uniformly around said ends to normalize the weld.

9. Means for butt-welding metallic members together including windings adapted to be positioned around adjacent parts of said members, means for passing alternating current through said windings to induce preheating currents in said parts, means for operating on said parts according to the operations required, including arc-welding the parts together with the windings still in place, means for regulating the current through said windings to normalize the weld, and means responsive to changes in temperature of the pipe parts to automatically control the current through said windings to hold the temperature to a predetermined value.

10. Means for butt-welding metallic magnetizable members together including windings adapted to be positioned around adjacent parts of said members, means for passing alternating current through said windings to induce preheating currents in said parts, means for operating on said parts according to the operations required, including arc-welding the parts together with the windings still in place, means for regulating the current through said windings to normalize the weld, and means responsive to changes in the temperature of the pipe parts to at least automatically reduce the current through said windings should the normalizing temperature reach a value such that the members to be welded lose their magnetizable property.

HARRY B. SMITH.
GEORGE A. DOLAN.